US009888414B2

(12) United States Patent
Deivasigamani et al.

(10) Patent No.: US 9,888,414 B2
(45) Date of Patent: *Feb. 6, 2018

(54) REDUCING CALL DROPS IN UPLINK POWER LIMITED SCENARIOS

(71) Applicant: Apple Inc., Cupertino, CA (US)

(72) Inventors: Giri Prassad Deivasigamani, San Jose, CA (US); Gaurav Nukala, Sunnyvale, CA (US); Muhammad A. Alam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,362

(22) Filed: Nov. 6, 2015

(65) Prior Publication Data
US 2016/0066224 A1 Mar. 3, 2016

Related U.S. Application Data

(63) Continuation of application No. 13/830,935, filed on Mar. 14, 2013, now Pat. No. 9,204,356.
(Continued)

(51) Int. Cl.
H04W 36/00 (2009.01)
H04W 36/30 (2009.01)
H04W 24/08 (2009.01)

(52) U.S. Cl.
CPC ....... *H04W 36/0083* (2013.01); *H04W 24/08* (2013.01); *H04W 36/0088* (2013.01); *H04W 36/30* (2013.01); *Y02B 60/50* (2013.01)

(58) Field of Classification Search
CPC ............ H04W 36/30; H04W 36/0088; H04W 36/0083; H04W 24/08; Y02B 60/50
(Continued)

(56) References Cited

U.S. PATENT DOCUMENTS 5,862,489 A * 1/1999 Aalto ................. H04W 52/50
370/331
8,886,239 B2 11/2014 Dayal et al.
(Continued)

FOREIGN PATENT DOCUMENTS

CN 1150512 A 5/1997
CN 102076010 A 5/2011
(Continued)

OTHER PUBLICATIONS

International Search Report and Written Opinion for PCT Application No. PCT/US2013/055956, dated Nov. 29, 2013.
(Continued)

Primary Examiner — Kan Yuen
Assistant Examiner — Richard Chang
(74) Attorney, Agent, or Firm — Downey Brand LLP

(57) ABSTRACT

A method for reducing call drops in uplink power limited scenarios is disclosed. The method can include a wireless communication device determining that the wireless communication device is experiencing an uplink power limited condition in which a transmission power of the wireless communication device is limited to a level below a power class level of the wireless communication device. The method can further include defining a downlink power threshold for sending a measurement report for triggering a handover based on the uplink power limited condition. The downlink power threshold can be higher than a threshold configured by a serving base station. The method can additionally include determining based on measured downlink power that the calculated downlink power threshold is satisfied and sending a measurement report for triggering a handover to the serving base station in response to the downlink power threshold being satisfied.

16 Claims, 12 Drawing Sheets

Related U.S. Application Data

(60) Provisional application No. 61/696,796, filed on Sep. 4, 2012.

(58) Field of Classification Search
USPC .................................................. 370/332, 329
See application file for complete search history.

(56) References Cited

U.S. PATENT DOCUMENTS

| | | | |
|---|---|---|---|
| 8,908,582 | B2 | 12/2014 | Damnjanovic et al. |
| 8,918,563 | B2 | 12/2014 | Ehsan et al. |
| 9,131,496 | B2 | 9/2015 | Torsner et al. |
| 9,282,462 | B2 | 3/2016 | Dayal et al. |
| 2005/0124349 | A1 | 6/2005 | Lin et al. |
| 2007/0049318 | A1 | 3/2007 | Qi et al. |
| 2011/0116395 | A1 | 5/2011 | Tsuda |
| 2011/0143805 | A1* | 6/2011 | Ramasamy ......... H04W 52/146 455/522 |
| 2012/0093020 | A1 | 4/2012 | Iwai et al. |
| 2012/0178494 | A1* | 7/2012 | Haim ................ H04W 52/365 455/522 |
| 2012/0220292 | A1 | 8/2012 | Yu et al. |
| 2013/0273919 | A1 | 10/2013 | Sashihara et al. |

FOREIGN PATENT DOCUMENTS

| | | |
|---|---|---|
| JP | 2007522763 A | 8/2007 |
| JP | 2011109539 A | 6/2011 |
| JP | 2013520098 A | 5/2013 |
| JP | 2013528973 A | 7/2013 |
| JP | 2013532426 A | 8/2013 |
| JP | 2013539299 A | 10/2013 |
| WO | WO2005079085 A1 | 8/2005 |
| WO | WO2010150552 A1 | 12/2010 |
| WO | WO2011100504 A1 | 8/2011 |
| WO | WO2011123555 A1 | 10/2011 |
| WO | WO2012040265 A1 | 3/2012 |
| WO | WO2012090357 A1 | 7/2012 |

OTHER PUBLICATIONS

Japanese Patent Application No. 2015-531103—Office Action dated Mar. 9, 2016.

Taiwanese Patent Application. No. 102131694—Office Action dated Jan. 16, 2015.

Chinese Patent Application for Invention No. 201380054004—First Office Action dated Sep. 4, 2017.

* cited by examiner

REDUCING CALL DROPS IN UPLINK POWER LIMITED SCENARIOS

CROSS-REFERENCE TO RELATED APPLICATIONS

This application is a continuation of U.S. application Ser. No. 13/830,935 filed Mar. 14, 2013, now U.S. Pat. No. 9,204,356 issued Mar. 6, 2014, which claims the benefit of U.S. Provisional Application No. 61/696,796 filed Sep. 4, 2012, both of which are incorporated by reference herein in their entireties for all purposes.

FIELD OF THE DESCRIBED EMBODIMENTS

The described embodiments relate generally to wireless communications and more particularly to reducing call drops in uplink power limited scenarios.

BACKGROUND

Wireless communication devices can be configured with a power class defining a maximum uplink transmission power capability of the device. For example, UEs (user equipment devices) categorized as power class 3 UEs on a Long Term Evolution (LTE) network can have a maximum uplink transmission power capability of +23 dBm (decibels per milliwatt). However, due to factors, such as Federal Communications Commission (FCC) restrictions, devices are often limited to transmitting at a power lower than the maximum uplink transmission power capability. This situation can result in an uplink power limited scenario.

When a wireless communication device experiences an uplink power limited scenario, it can reduce an effective coverage area of a serving cell. In this regard, a cell can be configured with an effective coverage radius on the basis of a device's power class. Thus in an uplink power limited scenario, a wireless communication device can be within sufficient range of the serving base station to be able to successfully receive and decode downlink messages sent to the device, but, due to transmission power limitations, may not be able to successfully send uplink messages to the serving base station.

Measurement reports triggered on the basis of downlink power can be used to trigger a handover decision by a serving base station. However, in the case of an imbalanced link budget in which downlink power is within acceptable parameters configured on the basis of a device's power class but the device is experiencing an uplink power limited condition limiting the effective coverage area of the cell, the serving base station can be unaware of the device's transmission power limited condition. As such, the serving base station can assume that the wireless communication device remains within the cell coverage area even though the wireless communication device may be outside of the effective coverage range of the cell and unable to successfully transmit uplink messages to the serving base station. Accordingly, a handover may not be triggered and call drops can occur due to uplink radio link failure in transmission power limited scenarios.

SUMMARY OF THE DESCRIBED EMBODIMENTS

Some example embodiments disclosed herein provide for reducing occurrence of call drops in uplink power limited scenarios. For example, a wireless communication device in accordance with some example embodiments can be configured to self-define a downlink power threshold for sending a measurement report for triggering a handover when experiencing an uplink power limited condition so that the device can report an event for triggering a handover more quickly in an uplink power limited condition before a call drop occurs. Additionally or alternatively, a wireless communication device in accordance with some example embodiments can be configured to report that the device is experiencing a condition other than an actually observed condition to trigger modification of an uplink grant and/or data rates when experiencing an uplink power limited condition so as to enable the device to better cope with the condition and reduce the incidence of call drops. As a further example, a wireless communication device in accordance with some example embodiments can additionally or alternatively be configured to signal its explicit uplink transmission power capability, which can be less than a transmission power associated with the device's power class, to a serving network to enable the serving network to specifically configure a measurement reporting threshold for the device based on its explicit uplink transmission power capability. As still a further example, a wireless communication device in accordance with some example embodiments can additionally or alternatively be configured to send a measurement report indicating that it is experiencing an uplink power limited condition to a serving base station to inform the serving base station of the condition and enable the serving base station to make a handover decision before a call drop occurs. Users may accordingly benefit from various embodiments by experiencing a reduced incidence of call drops.

In a first embodiment, a method for reducing call drops in uplink power limited scenarios is provided. The method of the first embodiment can include a wireless communication device determining that the wireless communication device is experiencing an uplink power limited condition in which a transmission power of the wireless communication device is limited to a level below a power class level of the wireless communication device. The method of the first embodiment can further include the wireless communication device defining a downlink power threshold for sending a measurement report for triggering a handover based at least in part on the uplink power limited condition. The downlink power threshold can be higher than a threshold configured by a serving base station. The method of the first embodiment can additionally include the wireless communication device determining based at least in part on measured downlink power that the downlink power threshold is satisfied. The method of the first embodiment can also include the wireless communication device sending a measurement report for triggering a handover to the serving base station in response to the downlink power threshold being satisfied.

In a second embodiment, a wireless communication device is provided. The wireless communication device of the second embodiment can include a transceiver and processing circuitry coupled to the transceiver. The transceiver can be configured to send signals to and receive signals from a serving base station of a cellular network. The processing circuitry can be configured to control the wireless communication device of the second embodiment to at least determine that the wireless communication device is experiencing an uplink power limited condition in which a transmission power of the wireless communication device is limited to a level below a power class level of the wireless communication device. The processing circuitry can be further configured to control the wireless communication device of the second embodiment to define a downlink power threshold for sending a measurement report for triggering a handover based at least in part on the uplink power limited condition. The downlink power threshold can be higher than a threshold configured by the serving base station. The processing circuitry can be additionally configured to control the wireless communication device of the second embodiment to determine based at least in part on measured downlink power that the downlink power threshold is satisfied; and send a measurement report for triggering a handover to the serving base station in response to the downlink power threshold being satisfied.

In a third embodiment, a computer program product for reducing call drops in uplink power limited scenarios is provided. The computer program product of the third embodiment can include at least one non-transitory computer readable storage medium having program code stored thereon. The program code of the third embodiment can include program code for determining that the wireless communication device is experiencing an uplink power limited condition in which a transmission power of the wireless communication device is limited to a level below a power class level of the wireless communication device. The program code of the third embodiment can further include program code for defining a downlink power threshold for sending a measurement report for triggering a handover based at least in part on the uplink power limited condition. The downlink power threshold can be higher than a threshold configured by a serving base station. The program code of the third embodiment can additionally include program code for determining based at least in part on measured downlink power that the downlink power threshold is satisfied. The program code of the third embodiment can also include program code for sending a measurement report for triggering a handover to the serving base station in response to the downlink power threshold being satisfied.

In a fourth embodiment, a method for reducing call drops in uplink power limited scenarios is provided. The method of the fourth embodiment can include a wireless communication device determining that the wireless communication device is experiencing an uplink power limited condition in which a transmission power of the wireless communication device is limited to a level below a power class level of the wireless communication device; and sending a report to a serving base station in response to the uplink power limited condition. The report can indicate that the wireless communication device is experiencing a condition other than a condition actually observed by the wireless communication device to trigger the serving base station to reduce a grant level to the wireless communication device.

In a fifth embodiment, a wireless communication device is provided. The wireless communication device of the fifth embodiment can include a transceiver and processing circuitry coupled to the transceiver. The transceiver can be configured to send signals to and receive signals from a serving base station of a cellular network. The processing circuitry can be configured to control the wireless communication device of the fifth embodiment to at least determine that the wireless communication device is experiencing an uplink power limited condition in which a transmission power of the wireless communication device is limited to a level below a power class level of the wireless communication device; and send a report to the serving base station in response to the uplink power limited condition. The report can indicate that the wireless communication device is experiencing a condition other than a condition actually observed by the wireless communication device to trigger the serving base station to reduce a grant level to the wireless communication device.

In a sixth embodiment, a computer program product for reducing call drops in uplink power limited scenarios is provided. The computer program product of the sixth embodiment can include at least one non-transitory computer readable storage medium having program code stored thereon. The program code of the sixth embodiment can include program code for determining that the wireless communication device is experiencing an uplink power limited condition in which a transmission power of the wireless communication device is limited to a level below a power class level of the wireless communication device; and program code for sending a report to a serving base station in response to the uplink power limited condition. The report can indicate that the wireless communication device is experiencing a condition other than a condition actually observed by the wireless communication device to trigger the serving base station to reduce a grant level to the wireless communication device.

In a seventh embodiment, a method for reducing call drops in uplink power limited scenarios is provided. The method of the seventh embodiment can include a wireless communication device determining that the wireless communication device is experiencing an uplink power limited condition in which a transmission power of the wireless communication device is limited to a level below a power class level of the wireless communication device; and internally signaling an indication of the uplink power limited condition to one or more of a transport layer or an application layer of the wireless communication device to slow an arrival of data for uplink transmission in response to the uplink power limited condition.

In an eighth embodiment, a wireless communication device is provided. The wireless communication device of the eighth embodiment can include a transceiver and processing circuitry coupled to the transceiver. The transceiver can be configured to send signals to and receive signals from a cellular network. The processing circuitry can be configured to control the wireless communication device of the eighth embodiment to at least determine that the wireless communication device is experiencing an uplink power limited condition in which a transmission power of the wireless communication device is limited to a level below a power class level of the wireless communication device; and to internally signal an indication of the uplink power limited condition to one or more of a transport layer or an application layer of the wireless communication device to slow an arrival of data for uplink transmission in response to the uplink power limited condition.

In a ninth embodiment, a computer program product for reducing call drops in uplink power limited scenarios is provided. The computer program product of the ninth embodiment can include at least one non-transitory computer readable storage medium having program code stored thereon. The program code of the ninth embodiment can include program code for determining that the wireless communication device is experiencing an uplink power limited condition in which a transmission power of the wireless communication device is limited to a level below a power class level of the wireless communication device; and program code for internally signaling an indication of the uplink power limited condition to one or more of a transport layer or an application layer of the wireless communication device to slow an arrival of data for uplink transmission in response to the uplink power limited condition.

In a tenth embodiment, a method for reducing call drops in uplink power limited scenarios is provided. The method of the tenth embodiment can include a wireless communication device determining an explicit uplink transmission power capability of the wireless communication device. The explicit uplink transmission power capability can be less than a transmission power associated with a power class of the wireless communication device. The method of the tenth embodiment can further include the wireless communication device signaling the explicit uplink transmission power capability to a serving network.

In an eleventh embodiment, a wireless communication device is provided. The wireless communication device of the eleventh embodiment can include a transceiver and processing circuitry coupled to the transceiver. The transceiver can be configured to send signals to and receive signals from a cellular network. The processing circuitry can be configured to control the wireless communication device of the eleventh embodiment to at least determine an explicit uplink transmission power capability of the wireless communication device. The explicit uplink transmission power capability can be less than a transmission power associated with a power class of the wireless communication device. The processing circuitry can be further configured to control the wireless communication device of the eleventh embodiment to signal the explicit uplink transmission power capability to the serving network.

In a twelfth embodiment, a computer program product for reducing call drops in uplink power limited scenarios is provided. The computer program product of the twelfth embodiment can include at least one non-transitory computer readable storage medium having program code stored thereon. The program code of the twelfth embodiment can include program code for determining an explicit uplink transmission power capability of a wireless communication device. The explicit uplink transmission power capability can be less than a transmission power associated with a power class of the wireless communication device. The program code of the twelfth embodiment can further include program code for signaling the explicit uplink transmission power capability to a serving network.

In a thirteenth embodiment, a method for reducing call drops in uplink power limited scenarios is provided. The method of the thirteenth embodiment can include a wireless communication device determining that the wireless communication device is experiencing an uplink power limited condition in which a transmission power of the wireless communication device is limited to a level below a power class level of the wireless communication device; and sending a measurement report indicating the uplink power limited condition to a serving base station. The measurement report can be usable by the serving base station to make a handover decision.

In a fourteenth embodiment, a wireless communication device is provided. The wireless communication device of the fourteenth embodiment can include a transceiver and processing circuitry coupled to the transceiver. The transceiver can be configured to send signals to and receive signals from a serving base station of a cellular network. The processing circuitry can be configured to control the wireless communication device of the fourteenth embodiment to at least determine that the wireless communication device is experiencing an uplink power limited condition in which a transmission power of the wireless communication device is limited to a level below a power class level of the wireless communication device; and to send a measurement report indicating the uplink power limited condition to the serving base station. The measurement report can be usable by the serving base station to make a handover decision.

In a fifteenth embodiment, a computer program product for reducing call drops in uplink power limited scenarios is provided. The computer program product of the fifteenth embodiment can include at least one non-transitory computer readable storage medium having program code stored thereon. The program code of the fifteenth embodiment can include program code for determining that the wireless communication device is experiencing an uplink power limited condition in which a transmission power of the wireless communication device is limited to a level below a power class level of the wireless communication device; and program code for sending a measurement report indicating the uplink power limited condition to a serving base station. The measurement report can be usable by the serving base station to make a handover decision.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present specification are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
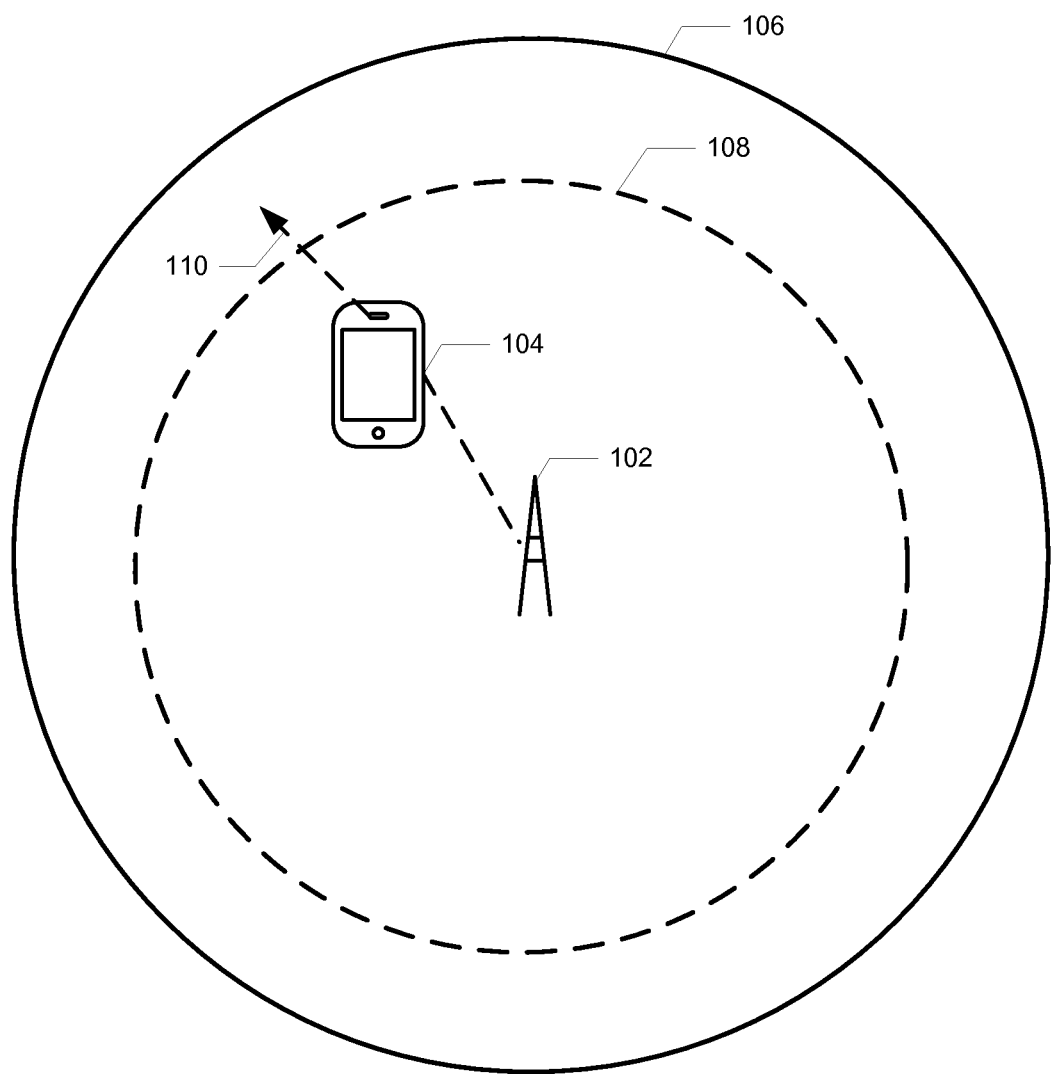
FIG. 1 illustrates limitation of an effective serving cell coverage area in an uplink power limited scenario.

Some example embodiments reduce occurrence of call drops in uplink power limited scenarios. FIG. 1 illustrates an example uplink power limited scenario that can be addressed by some example embodiments. In FIG. 1, a serving base station 102 can provide access to a cellular network to a wireless communication device 104. The base station 102 can, for example, comprise any base station, base transceiver station (BTS), node B, evolved node B (eNB), or other cellular base station in various embodiments. In this regard, the type of base station implemented by base station 102 can vary depending on a radio access technology (RAT) used by the base station 102. For example, in embodiments in which the base station 102 implements a Long Term Evolution (LTE) RAT, such as LTE, LTE-Advanced (LTE-A), or the like, the base station 102 can be an eNB. Wireless communication device 104 can, for example, be a smart phone device, tablet computing device, laptop computer, or other computing device that can be configured to operate on a cellular network.

The serving base station 102 can serve a cell having a coverage area 106. The coverage area 106 can, for example, correlate to a power class of the wireless communication device 104. In this regard, the coverage area 106 can define an area in which wireless communication device 104 can both successfully receive and decode downlink messages that can be sent by the serving base station 102 and can successfully transmit uplink messages to the serving base station 102 when using its maximum transmission power in accordance with its power class. Thus, for example, if the wireless communication device 104 is an LTE power class 3 UE having a 23 dBm transmission power, coverage area 106 can define an area in which uplink transmissions sent by the wireless communication device 104 can successfully reach the serving base station 102. In some example embodiments, the coverage area 106 can be defined as an area in which at least a threshold block error rate (BLER) can be satisfied for a given device power class, assuming uplink transmissions can occur at up to a transmission power associated with the device power class.

Due to various conditions, the wireless communication device 104 can be power limited to a transmission power less than its power class. For example, the wireless communication device 104 can be power limited to a transmission power of 15 dBm. Transmission power limitations of the wireless communication device 104 can limit the effective range of the serving cell to an area 108, which can be smaller than the area 106. In this regard, while the wireless communication device 104 may be able to successfully receive and decode downlink messages throughout the area 106 in a power limited scenario, uplink messages sent by the wireless communication device 104 may not successfully reach the serving base station 102 if the wireless communication device 104 moves outside of the area 108. Thus, if the wireless communication device 104 is traveling in a direction noted by reference 110, an imbalanced link budget condition can result in which calls can be dropped. In this regard, the wireless communication device 104 can remain on the serving cell due to traditional handover measurements not being triggered as downlink power measurements can be satisfactory. However, the wireless communication device 104 can be unable to successfully send uplink messages to the serving base station 102 due to its uplink power limited condition, which can result in uplink radio link failure and dropped calls. Some example embodiments disclosed herein reduce the occurrence of call failures in such scenarios.

Figure 2:
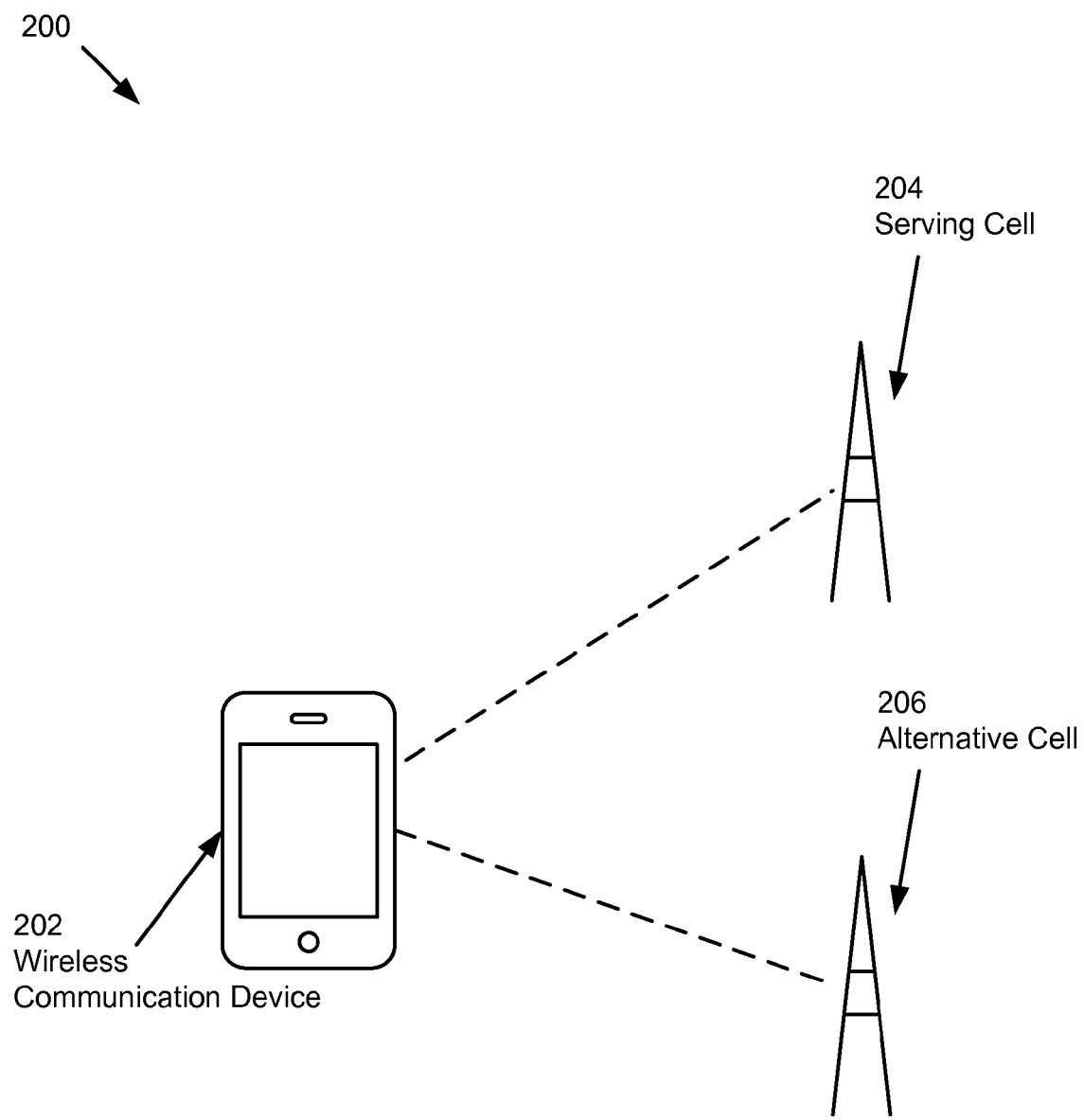
FIG. 2 illustrates a wireless communication system in accordance with some example embodiments.

FIG. 2 illustrates a wireless communication system 200 in accordance with some example embodiments. The system 200 can include a wireless communication device 202, which, by way of non-limiting example, can be embodied as a cellular phone, such as a smart phone device; a tablet computing device; a laptop computing device; or other computing device that can be configured to connect to a cellular network.

The wireless communication device 202 can be camped on a serving cell 204 of a serving cellular network. The serving cell 204 can have an associated serving base station, which can be embodied as any of a variety of cellular base stations, including, by way of non-limiting example, a base station, BTS, node B, eNB, and/or the like, depending on a type of RAT implemented by the serving cellular network. In this regard, the serving cellular network can implement any of a variety of cellular RATs, such as, by way of non-limiting example, an LTE RAT, Universal Mobile Telecommunications System (UMTS) RAT, code division multiple access (CDMA) RAT, CDMA2000 RAT, Time Division Synchronous Code Division Multiple Access (TD-SCDMA) RAT, global system for mobile communications (GSM) RAT, high rate packet data (HRPD) RAT, 1x/EV-DO, or other existing or future developed cellular RAT.

The wireless communication device 202 can also be within coverage range and/or can enter coverage range during operation of an alternative cell 206. The alternative cell 206 can, for example, be a neighboring cell of the serving cell 204 within the serving cellular network in some example embodiments. As another example, in some example embodiments, the alternative cell 206 can be a cell of an alternative RAT, which can be co-deployed with the RAT used by the serving cellular network. As such, it will be appreciated that the alternative cell 206 can use any type of cellular RAT, including, by way of non-limiting example, an LTE RAT, UMTS RAT, CDMA RAT, TD-SCDMA RAT, GSM RAT, HRPD RAT, 1×/EV-DO, or other existing or future developed cellular RAT.

When channel conditions of the serving cell 204 become poor, the wireless communication device 202 can be handed over to the alternative cell 206. Such handover can, for example, be an inter-frequency handover in which both the serving cell 204 and alternative cell 206 utilize the same RAT. As another example, a handover from the serving cell 204 to the alternative cell 206 can be an inter-radio access technology (inter-RAT) handover in embodiments in which the serving cell 204 and alternative cell 206 implement different RATs. In accordance with some example embodiments, a handover from the serving cell 204 to the alternative cell 206 can be triggered in response to the wireless communication device 202 encountering an uplink transmission power limited scenario while camped on the serving cell 204.

In embodiments in which the serving cell 204 and alternative cell 206 utilize different RATs and an inter-RAT handover between from the serving cell 204 to the alternative cell 206 can be triggered in response to an uplink transmission power limited scenario, cells using the two RATs can be co-deployed with overlapping coverage areas. The alternative cell 206 can, for example, have a larger coverage area than the serving cell 204 based on respective coverage areas of the respective RATs that can be used by the serving cell 204 and alternative cell 206. As such, in some example embodiments, a handover to the alternative cell in an instance in which the wireless communication device 202 is experiencing an uplink transmission power limited scenario can provide better coverage for the wireless communication device 202 and prevent call drops. As a non-limiting example, the serving cell 204 can be an LTE cell, which can be overlaid with one or more legacy RAT cells, such as a UMTS cell, 1×/EV-DO cell, and/or the like. The legacy cells can have a larger coverage area than the LTE cell. Thus, if the wireless communication device 104 encounters an uplink transmission power limited scenario while camped on an LTE cell, an inter-RAT handover to a legacy RAT can be triggered in accordance with some example embodiments.

Figure 3:
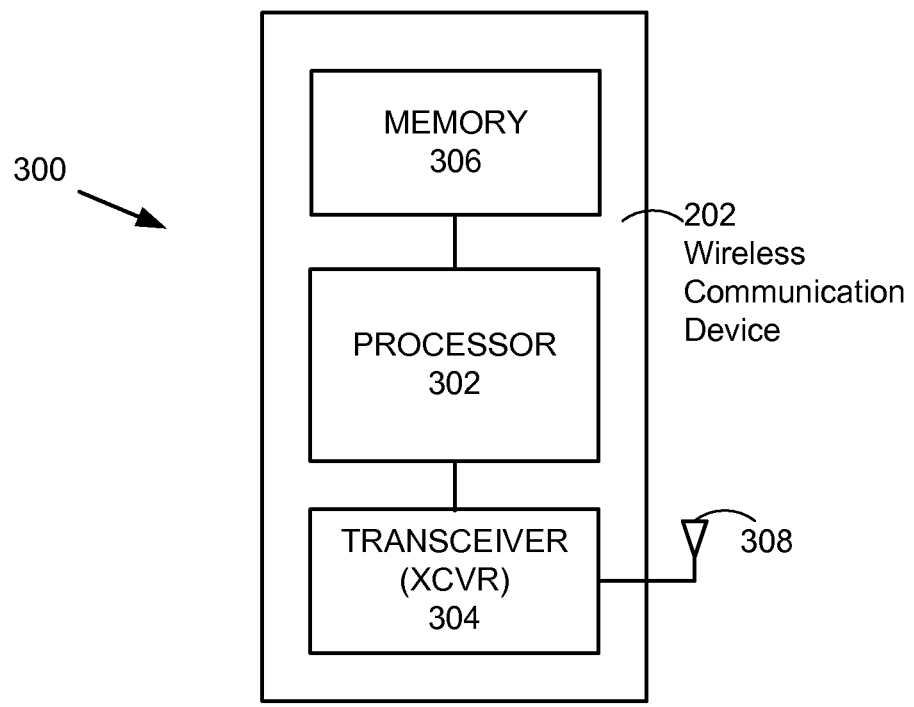
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. The apparatus 300 can include a processor 302 coupled to memory 306 and also coupled to a wireless transceiver 304. Processor 302 can be configured to read, write and execute processor instructions stored in memory 306. Processor 302 can also be configured to control wireless transceiver 304. Wireless transceiver 304 can be coupled to an antenna 308. In some embodiments, wireless transceiver 304, in combination with antenna 308 can be configured to enable the wireless communication device 202 to connect to one or more wireless networks, such as via serving cell 204 and/or alternative cell 206. It will be appreciated that the processor 302 can be configured through hardware, software (e.g., software that can be stored in memory 306), firmware (e.g., firmware that can be stored in memory 306), and/or some combination thereof to control one or more operations that can be performed by a wireless communication device 202 in accordance with various example embodiments.

Figure 4:
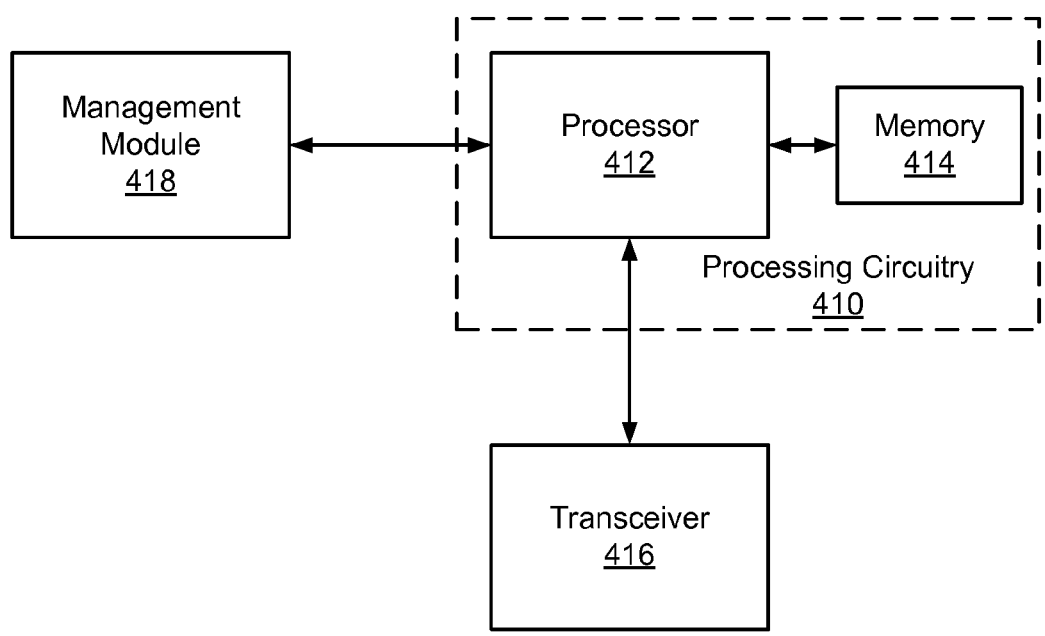
FIG. 4 illustrates another block diagram of an apparatus that can be implemented on a wireless communication device in accordance with some example embodiments.

FIG. 4 illustrates a block diagram of an apparatus 400, which is another example apparatus that can be implemented on a wireless communication device 202 in accordance with some example embodiments. When implemented on a computing device, such as wireless communication device 202, apparatus 400 can provide an apparatus configured to enable the computing device to operate within the system 200 in accordance with one or more example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the wireless communication device 202 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which can each include one or more chips. The processing circuitry 410 and/or one or more further components of the apparatus 400 can therefore, in some instances, be configured to implement an embodiment on a chipset(s). In some example embodiments in which one or more components of the apparatus 400 are embodied as a chipset, the chipset can be capable of enabling a computing device to operate in the system 200 when implemented on or otherwise operably coupled to the computing device. Thus, for example, one or more components of the apparatus 400 can provide a cellular baseband chipset, which can enable a computing device to operate within a cellular network.

In some example embodiments, the processing circuitry 410 can include a processor 412 and, in some embodiments, such as that illustrated in FIG. 4, can further include memory 414. The processing circuitry 410 can be in communication with or otherwise control a transceiver 416 and/or management module 418.

The processor 412 can be embodied in a variety of forms. For example, the processor 412 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the apparatus 400 as described herein. The processor 412 of some example embodiments can be an embodiment of the processor 302. In some example embodiments, the processor 412 can be configured to execute instructions that can be stored in the memory 414 or that can be otherwise accessible to the processor 412. As such, whether configured by hardware or by a combination of hardware and software, the processor 412 can be capable of performing operations according to various embodiments while configured accordingly.

In some example embodiments, the memory 414 can include one or more memory devices. Memory 414 can include fixed and/or removable memory devices. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the apparatus 400 to carry out various functions in accordance with one or more example embodiments. The memory 414 of some example embodiments can be an embodiment of the memory 306. In some embodiments, the memory 414 can be in communication with one or more of the processor 412, transceiver 416, or management module 418 via a bus(es) for passing information among components of the apparatus 400.

The apparatus 400 can further include transceiver 416. The transceiver 416 can enable the apparatus 400 to send wireless signals to and receive signals from one or more cellular networks. As such, the transceiver 416 can be configured to support any type of cellular RAT that can be implemented by the serving cell 204 and/or alternative cell 206. In some example embodiments, the transceiver 416 can be an embodiment of the transceiver 304.

The apparatus 400 can further include management module 418. The management module 418 can be embodied as various means, such as circuitry, hardware, a computer program product comprising a computer readable medium (for example, the memory 414) storing computer readable program instructions executable by a processing device (for example, the processor 412), or some combination thereof. In some embodiments, the processor 412 (or the processing circuitry 410) can include, or otherwise control the management module 418. The management module 418 can be configured in some example embodiments to determine when the wireless communication device 202 is experiencing an uplink power limited condition and/or otherwise perform operations in accordance with one or more example embodiments described further herein below to support reduction of call drops in uplink power limited scenarios.

Figure 5:
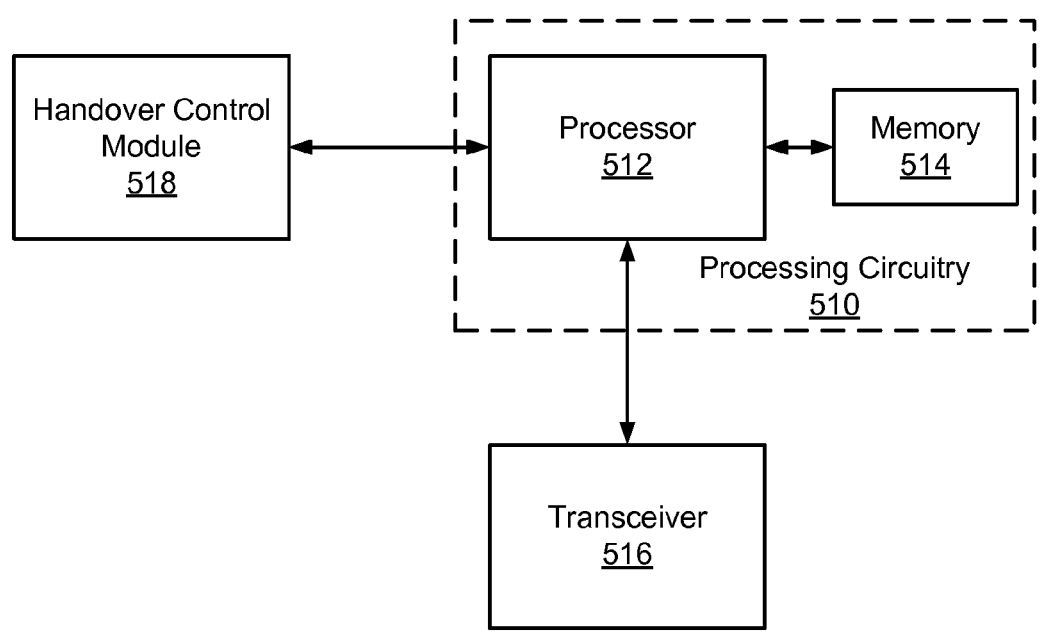
FIG. 5 illustrates a block diagram of an apparatus that can be implemented on a base station and/or other network entity in accordance with some example embodiments.

FIG. 5 illustrates a block diagram of an apparatus 500 that can be implemented on a base station and/or other network entity, such as can be associated with the serving cell 204, in accordance with some example embodiments. It will be appreciated that the components, devices or elements illustrated in and described with respect to FIG. 5 below may not be mandatory and thus some may be omitted in certain embodiments. Additionally, some embodiments can include further or different components, devices or elements beyond those illustrated in and described with respect to FIG. 5.

In some example embodiments, the apparatus 500 can include processing circuitry 510 that is configurable to perform actions in accordance with one or more example embodiments disclosed herein. In this regard, the processing circuitry 510 can be configured to perform and/or control performance of one or more functionalities of the apparatus 500 in accordance with various example embodiments, and thus can provide means for performing functionalities of a serving base station and/or other network entity of a serving network in accordance with various example embodiments. The processing circuitry 510 can be configured to perform data processing, application execution and/or other processing and management services according to one or more example embodiments.

In some embodiments, the apparatus 500 or a portion(s) or component(s) thereof, such as the processing circuitry 510, can include one or more chipsets, which can each include one or more chips. The processing circuitry 510 and/or one or more further components of the apparatus 500 can therefore, in some instances, be configured to implement an embodiment on a chipset(s).

In some example embodiments, the processing circuitry 510 can include a processor 512 and, in some embodiments, such as that illustrated in FIG. 5, can further include memory 514. The processing circuitry 510 can be in communication with or otherwise control a transceiver 516 and/or handover control module 518.

The processor 512 can be embodied in a variety of forms. For example, the processor 512 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of the apparatus 500 as described herein. In some example embodiments including a plurality of processors, the plurality of processors can be distributed across a plurality of apparatuses (e.g., a plurality of network entities), which can be in operative communication with each other to provide functionality of a serving cellular network in accordance with one or more example embodiments. In some example embodiments, the processor 512 can be configured to execute instructions that can be stored in the memory 514 or that can be otherwise accessible to the processor 512. As such, whether configured by hardware or by a combination of hardware and software, the processor 512 can be capable of performing operations according to various embodiments while configured accordingly.

In some example embodiments, the memory 514 can include one or more memory devices. Memory 514 can include fixed and/or removable memory devices. In some example embodiments including a plurality of memory devices, the plurality of memory devices can be distributed across a plurality of apparatuses (e.g., a plurality of network entities), which can be in operative communication with each other to provide functionality of a serving cellular network in accordance with one or more example embodiments. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the apparatus 500 to carry out various functions in accordance with one or more example embodiments. In some embodiments, the memory 514 can be in communication with one or more of the processor 512, transceiver 516, or handover control module 518 via a bus(es) for passing information among components of the apparatus 500.

The apparatus 500 can further include transceiver 516. The transceiver 516 can enable the apparatus 500 to send wireless signals to and receive signals from one or more wireless communication devices, such as the wireless communication device 202. As such, the transceiver 516 can be configured to support communication in accordance with any type of cellular RAT that can be implemented by the serving cell 204.

The apparatus 500 can further include handover control module 518. The handover control module 518 can be embodied as various means, such as circuitry, hardware, a computer program product comprising a computer readable medium (for example, the memory 514) storing computer readable program instructions executable by a processing device (for example, the processor 512), or some combination thereof. In some embodiments, the processor 512 (or the processing circuitry 510) can include, or otherwise control the handover control module 518. The handover control module 518 can be configured in some example embodiments to make a handover decision, such as a decision to handover the wireless communication device 202 to the alternative cell 206, based on a measurement report that can be sent by the wireless communication device 202. In some example embodiments, the handover control module 518 can additionally or alternatively be configured to define a configuration parameter for measurement reporting invents for the wireless communication device 202, as described further herein below.

The wireless communication device 202 of some example embodiments can be configured to self-define measurement thresholds for triggering a handover, such as an inter-RAT and/or inter-frequency handover, in an uplink power limited scenario. For example, the wireless communication device 202 of some such embodiments can define a downlink power threshold for sending a measurement report indicating that a channel condition of a serving cell, such as serving cell 204, has become worse than a threshold. As a more particular example, in some embodiments, such as some embodiments in which the serving cell 204 implements an LTE RAT, the wireless communication device 202 can be configured to self-define an A2 measurement event threshold, which can be different from an A2 measurement threshold that can be configured by the serving base station, for use when encountering an uplink power limited condition.

As a non-limiting example scenario in which such example embodiments can be applied, a serving base station can define a threshold for sending an A2 measurement as measured downlink power of −110 dBm. The wireless communication device 202 can, for example, be transmission power limited to 15 dBm in spite of being in a 23 dBm power class. In such a scenario, the wireless communication device 202 of some example embodiments can self-define a threshold for sending an A2 measurement as a measured downlink power of −102 dBm due to operating at an 8 dBm transmission power imbalance. In this regard, the wireless communication device 202 of some example embodiments can be configured to self define a threshold by calculating the sum of the network configured A2 measurement event threshold (e.g., −110 dBm) and an offset equivalent to the transmission power imbalance (e.g., 8 dBm). Accordingly, if a downlink power of −102 dBm or less is measured, the wireless communication device 202 can send an A2 measurement report to the serving base station trigger a handover rather than having to wait for downlink power to fall below −110 dBm. Handover can then occur earlier than it would if using network defined thresholds based on power class. As such, occurrence of call drops can be reduced.

In some example embodiments, when the threshold for sending an A2 measurement (e.g., a network defined threshold and/or a device-calculated threshold in accordance with some example embodiments) is met, the wireless communication device 202 can immediately trigger a measurement report. Accordingly, a handover can be triggered more rapidly.

Figure 6:
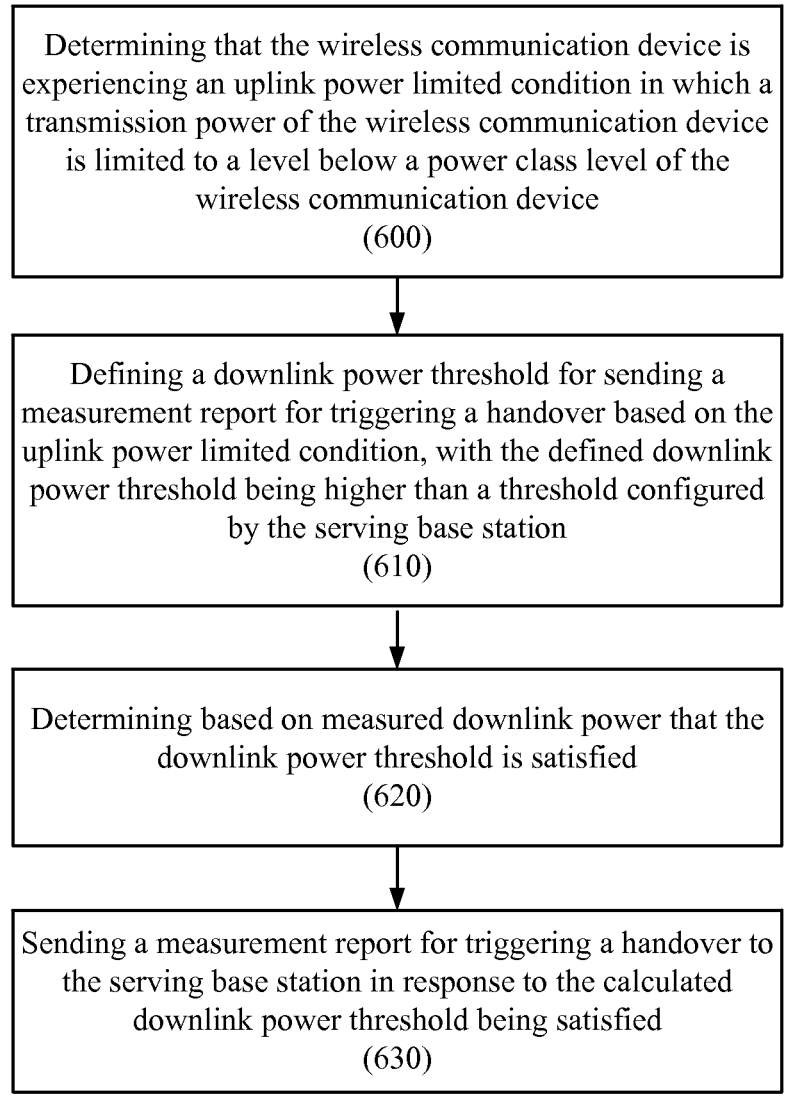
FIG. 6 illustrates a flowchart according to an example method for reducing call drops in uplink power limited scenarios in accordance with some example embodiments.

FIG. 6 illustrates a flowchart according to an example method for reducing call drops in uplink power limited scenarios in accordance with some example embodiments in which wireless communication device 202 can self-define a downlink power threshold for sending a measurement report for triggering a handover when experiencing an uplink power limited condition. One or more of processing circuitry 410, processor 412, memory 414, or management module 418 can, for example, provide means for performing the operations illustrated in and described with respect to FIG. 6.

Operation 600 can include wireless communication device 202 determining that it is experiencing an uplink power limited condition in which a transmission power of the wireless communication device 202 is limited to a level below a power class level of the wireless communication device 202. The uplink power limited condition can, for example, be determined through determination of a low power headroom value, a high number of outstanding radio link control (RLC) packet data units (PDUs) for signaling radio bearer (SRB) transmissions, some combination thereof, or the like.

For example, in some example embodiments, operation 600 can include the wireless communication device 202 determining that an uplink transmission power at which the wireless communication device 202 is transmitting is within a threshold range of an explicit maximum uplink transmission power to which the wireless communication device 202 can be limited. The explicit maximum uplink transmission power can be lower than a transmission power associated with a power class level of the wireless communication device 202. In this regard, in some example embodiments, operation 600 can include determining that an available power headroom value is less than a threshold.

As another example, in some example embodiments, operation 600 can include the wireless communication device 202 calculating a difference between a transmission power associated with the power class level of the wireless communication device and a transmission power at which the wireless communication device is transmitting (e.g., an explicit maximum uplink transmission power for the device) and comparing the difference to a threshold maximum (Pmax). In an instance in which the difference exceeds Pmax, the wireless communication device 202 can determine that it is experiencing an uplink power limited condition.

As a further example, in some example embodiments, operation 600 can include the wireless communication device 202 determining that there are more than a threshold number of outstanding PDUs for SRB transmission.

Operation 610 can include the wireless communication device 202 defining a downlink power threshold for sending a measurement report for triggering a handover, such as an inter-RAT handover and/or inter-frequency handover, based at least in part on the uplink power limited condition. The defined downlink power threshold can be higher than a threshold configured by a serving base station. In some example embodiments, the defined downlink power threshold can be a threshold for sending a measurement report indicating that a channel condition (e.g., a measured downlink power and/or other channel quality indication) of the serving cell 204 has become worse than a threshold. For example, in embodiments in which the serving cell 204 implements an LTE RAT, the defined downlink power threshold can be an A2 measurement event threshold.

In some example embodiments, operation 610 can include the wireless communication device 202 defining the downlink power threshold based at least in part on a transmission power imbalance representing a difference between a transmission power associated with the power class level of the wireless communication device 202 and a transmission power to which the wireless communication device 202 can be limited due to the uplink power limited condition. For example, the downlink power threshold can be calculated in some example embodiments by adding an offset equivalent to the transmission power imbalance to the network configured threshold.

Operation 620 can include the wireless communication device 202 determining based at least in part on a measured downlink power that the downlink power threshold that can be defined in operation 610 is satisfied. Operation 630 can include the wireless communication device 202 sending a measurement report for triggering a handover to the serving base station in response to the calculated downlink power threshold being satisfied. The wireless communication device 202 may receive a handover command, such as a command redirecting the wireless communication device 202 to the alternative cell 206, from the serving base station in response to the measurement report. As such, by self-defining a downlink power threshold when experiencing an uplink power limited condition, the wireless communication device 202 of some example embodiments may trigger handover to occur before a call drop occurs as a result of the uplink power limited condition.

Figure 7:
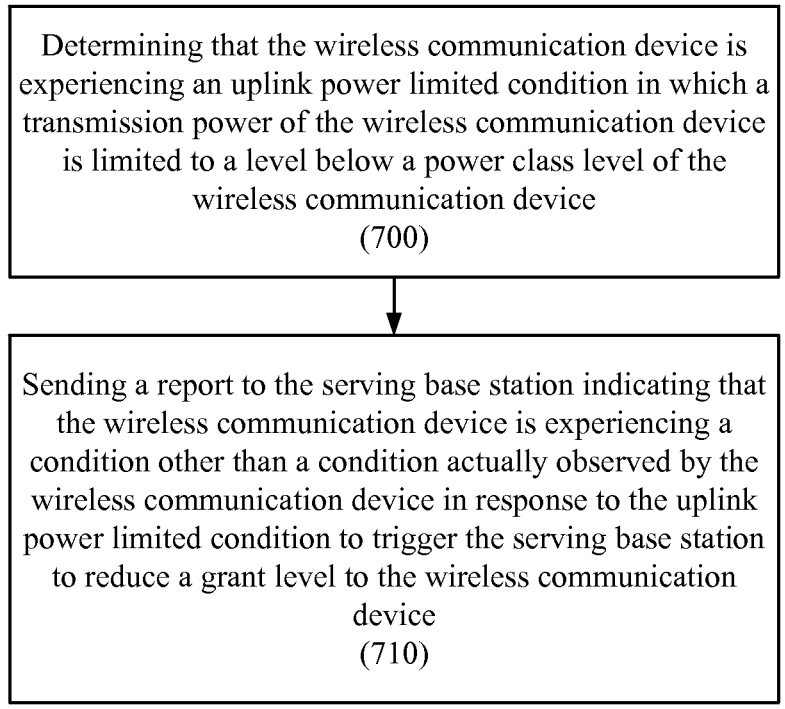
FIG. 7 illustrates a flowchart according to another example method for reducing call drops in uplink power limited scenarios in accordance with some example embodiments.

In some example embodiments, the wireless communication device 202 can be configured to signal the serving base station that the device is experiencing a condition other than a condition actually observed by the wireless communication device 202 in instances in which the wireless communication device 202 is experiencing an uplink power limited condition. FIG. 7 illustrates a flowchart according to an example method for reducing call drops in uplink power limited scenarios in accordance with some such example embodiments. One or more of processing circuitry 410, processor 412, memory 414, or management module 418 can, for example, provide means for performing the operations illustrated in and described with respect to FIG. 7.

Operation 700 can include the wireless communication device 202 determining that it is experiencing an uplink power limited condition in which a transmission power of the wireless communication device 202 is limited to a level below a power class level of the wireless communication device 202. For example, in some example embodiments, operation 700 can include the wireless communication device 202 determining that an uplink transmission power at which the wireless communication device 202 is transmitting is within a threshold range of an explicit maximum uplink transmission power to which the wireless communication device 202 can be limited. The explicit maximum uplink transmission power can be lower than a transmission power associated with a power class level of the wireless communication device 202. In this regard, in some example embodiments, operation 700 can include determining that an available power headroom value is less than a threshold.

As another example, in some example embodiments, operation 700 can include the wireless communication device 202 calculating a difference between a transmission power associated with the power class level of the wireless communication device and a transmission power at which the wireless communication device is transmitting (e.g., an explicit maximum uplink transmission power for the device) and comparing the difference to a threshold maximum (Pmax). In an instance in which the difference exceeds Pmax, the wireless communication device 202 can determine that it is experiencing an uplink power limited condition.

As a further example, in some example embodiments, operation 700 can include the wireless communication device 202 determining that there are more than a threshold number of outstanding PDUs for SRB transmission.

Operation 710 can include the wireless communication device 202 sending a report to the serving base station indicating that the wireless communication device 202 is experiencing a condition other than a condition actually observed by the wireless communication device in response to the uplink power limited condition. The report indicating the modified, or false, condition can be sent to trigger the serving base station to reduce a grant level to the wireless communication device. For example, the wireless communication device 202 can be configured to signal conservative (e.g., underreport) buffer status reports (BSRs) compared to an observed buffer status. As another example, the wireless communication device 202 can additionally or alternatively be configured to send conservative power headroom reports (PHRs), which can underreport an actually observed power headroom value. The serving base station can accordingly, for example, be influenced to reduce a grant level to the wireless communication device 202. The wireless communication device 202 can, in turn, be configured to use the reduced grant to slow an uplink data rate in response to the uplink power limited condition, which can reduce the occurrence of call drops in power limited scenarios.

In this regard, the transmission power level of the wireless communication device 202 can be influenced by a combination of both path loss (PL) and a number of resource blocks assigned to the device by the network. Using conservative reporting (e.g., underreporting) for BSRs and/or PHRs can trigger the network to assign fewer resource blocks to the wireless communication device 202, which can increase an uplink transmission power capability of the wireless communication device 202 and reduce the possibility of a call drop occurring in an uplink power limited condition.

In embodiments in which BSRs can be conservatively reported, the wireless communication device 202 can be configured to slow down its data rate and send lower BSRs. In this regard, the wireless communication device 202 can send a BSR indicating that less data is pending in an uplink buffer than is actually pending. For example, an actual BSR value can be 63, but the wireless communication device 202 can send a lower BSR, such as a BSR of 30 in response to an uplink transmission power limited scenario. The network can in turn reduce a number of resource blocks assigned to the wireless communication device 202, thus increasing the likelihood that the serving base station can hear the device.

For a further example, in embodiments in which power headroom can be conservatively reported, the wireless communication device 202 can underreport the device's actual power headroom. The actual power headroom can, for example, be defined as a difference between nominal transmission power (e.g., a transmission power associated with the device's power class) and an actual transmission power at which the device is transmitting, which can be limited in uplink transmission power limited scenarios. By underreporting the power headroom in such scenarios, the serving base station can give a lower grant, or perhaps not give any grant to the wireless communication device 202, thus putting the device on a lower data rate that can enable sustaining a call even in an uplink transmission power limited scenario. In some such embodiments, a threshold maximum power headroom (Pmax) can be defined. If actual measured power headroom exceeds Pmax, the wireless communication device 202 can determine that it is in an uplink transmission power limited scenario and can underreport its power headroom. If the power scenario later improves, the wireless communication device 202 can adjust its PHR to report a larger power headroom value and/or report actually measured power headroom to trigger a larger grant from the serving base station.

In some example embodiments in which the wireless communication device 202 is configured to send the serving base station a report that the device is experiencing a condition other than a condition actually observed by the wireless communication device, such as by signaling conservative BSRs and/or PHRs in an uplink transmission power limited scenario, the signaling can be initiated and/or otherwise handled directly at the media access control (MAC) layer (e.g., a baseband layer).

Figure 8:
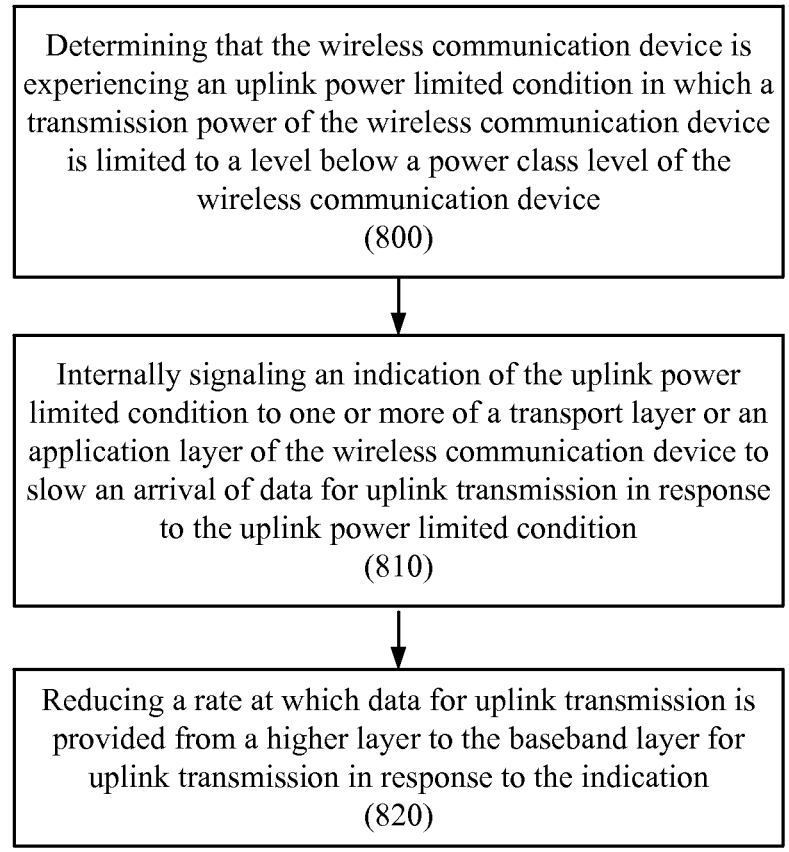
FIG. 8 illustrates a flowchart according to a further example method for reducing call drops in uplink power limited scenarios in accordance with some example embodiments.

The wireless communication device 202 of some example embodiments can be configured to internally slow arrival of data for uplink transmission from higher layers in response to an uplink power limited condition. FIG. 8 illustrates a flowchart according to an example method for reducing call drops in uplink power limited scenarios in accordance with some such example embodiments. One or more of processing circuitry 410, processor 412, memory 414, or management module 418 can, for example, provide means for performing the operations illustrated in and described with respect to FIG. 8.

Operation 800 can include the wireless communication device 202 determining that it is experiencing an uplink power limited condition in which a transmission power of the wireless communication device 202 is limited to a level below a power class level of the wireless communication device 202. For example, in some example embodiments, operation 800 can include the wireless communication device 202 determining that an uplink transmission power at which the wireless communication device 202 is transmitting is within a threshold range of an explicit maximum uplink transmission power to which the wireless communication device 202 can be limited. The explicit maximum uplink transmission power can be lower than a transmission power associated with a power class level of the wireless communication device 202. In this regard, in some example embodiments, operation 800 can include determining that an available power headroom value is less than a threshold.

As another example, in some example embodiments, operation 800 can include the wireless communication device 202 calculating a difference between a transmission power associated with the power class level of the wireless communication device and a transmission power at which the wireless communication device is transmitting (e.g., an explicit maximum uplink transmission power for the device) and comparing the difference to a threshold maximum (Pmax). In an instance in which the difference exceeds Pmax, the wireless communication device 202 can determine that it is experiencing an uplink power limited condition.

As a further example, in some example embodiments, operation 800 can include the wireless communication device 202 determining that there are more than a threshold number of outstanding PDUs for SRB transmission.

Operation 810 can include the wireless communication device 202 internally signaling an indication of the uplink power limited condition to a higher layer(s), such as one or more of the transport layer (e.g., a Transmission Control Protocol (TCP) layer and/or other transport layer) or the application layer, to slow an arrival of data for uplink transmission in response to the uplink power limited condition. In some example embodiments, the determination of operation 800 can be performed at the baseband layer and the baseband layer can perform the internal signaling of the higher layer in operation 810.

In some example embodiments, the signaling of operation 810 can comprise explicitly signaling a higher layer(s) that the device is experiencing an uplink power limited condition. In this regard, one or more higher layers can be modified in accordance with some example embodiments to recognize dedicated internal signaling from the baseband layer indicating that the wireless communication device 202 is experiencing an uplink power limited condition, and can be configured to reduce a rate at which data for uplink transmission is provided to the baseband layer and/or other lower layer(s) in response to the signaling.

As another example, in some example embodiments, the signaling of operation 810 can include signaling an indication that the wireless communication device 202 is experiencing a condition other than a condition actually observed at the baseband layer. For example, the baseband layer can signal one or more higher layers with an indication of a conservative power headroom and/or BSR status, such as described with respect to operation 710 of the method illustrated in and described with respect to FIG. 7. Such underreporting can trigger the higher layer(s) to reduce a rate at which data for uplink transmission is provided to the baseband layer and/or other lower layer(s) in some example embodiments.

Operation 820 can include reducing a rate at which data for uplink transmission is provided from a higher layer to the baseband layer for uplink transmission in response to the indication signaled in operation 810. For example, operation 820 can be performed by a transport layer and/or application layer in response to the signaling of operation 810.

In some example embodiments, the application layer can be configured to advertize a zero TCP window size in response to receiving the indication of the uplink power limited condition. In this regard, a congested condition can be signaled so that less data is sent.

In some example embodiments, an interval between two measurement reports sent by the wireless communication device 202 can be reduced (e.g., minimized) in uplink transmission power limited conditions as, in some embodiments, a serving base station can be configured to receive some threshold number of measurement reports for a particular event before triggering a handover.

Figure 9:
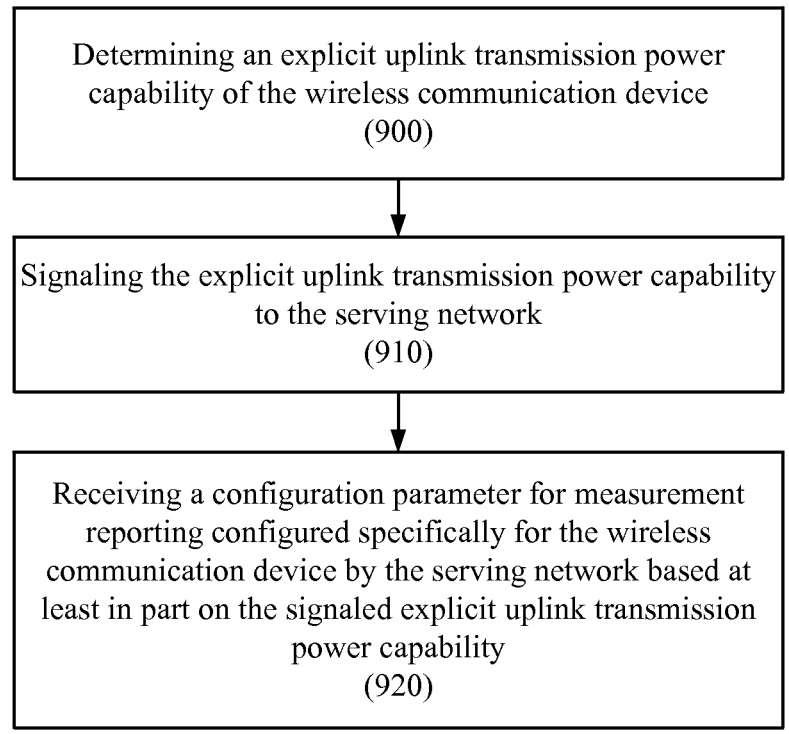
FIG. 9 illustrates a flowchart according to yet another example method for reducing call drops in uplink power limited scenarios in accordance with some example embodiments.

The wireless communication device 202 of some example embodiments can advertise its explicit transmission power capability to the network (e.g., to the serving base station) in addition to or in lieu of its power class. As such, the wireless communication device 202 of such example embodiments can be provisioned with a measurement reporting configuration accounting for the device's uplink transmission power limitations. FIG. 9 illustrates a flowchart according to an example method for reducing call drops in uplink power limited scenarios in accordance with some such example embodiments. In this regard, FIG. 9 illustrates operations that can be performed by the wireless communication device 202 to advertise its explicit transmission power capability. One or more of processing circuitry 410, processor 412, memory 414, or management module 418 can, for example, provide means for performing the operations illustrated in and described with respect to FIG. 9.

Operation 900 can include the wireless communication device 202 determining its explicit uplink transmission power capability. Operation 910 can include the wireless communication device 202 signaling the explicit uplink transmission power capability to the serving network, such as to a serving base station associated with the serving cell 204. The explicit transmission power capability of the wireless communication device 202 can, for example, be signaled to the network in a capability information message, such as a classmark message.

Operation 920 can include the wireless communication device 202 receiving a configuration parameter for measurement reporting configured specifically for the wireless communication device by the serving network based at least in part on the signaled explicit uplink transmission power capability. In this regard, the network can then use the explicit power capability in providing device-specific configuration parameters for measurement reporting. The configuration parameter can, for example, define a threshold for sending a measurement report indicating that a channel condition of the serving cell has become worse than the threshold. For example, in embodiments in which the serving cell 204 implements an LTE RAT, the configuration parameter can define an A2 measurement event threshold.

The wireless communication device 202 can accordingly apply the received configuration parameter when evaluating measurement reporting events. As the configured threshold can be based on the device's explicit uplink transmission power capability rather than the device's power class, handover can be triggered more quickly in uplink power limited conditions and the incidence of call drops can be reduced.

Figure 10:
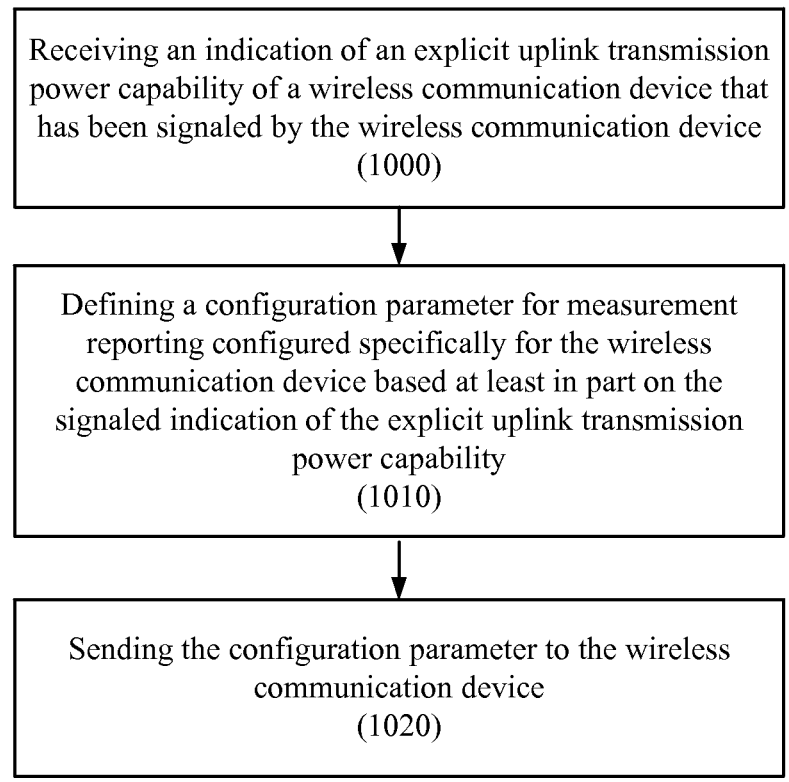
FIG. 10 illustrates a flowchart according to an example method for facilitating reduction in call drops in uplink power limited scenarios that can be performed by a serving network in accordance with some example embodiments.

FIG. 10 illustrates a flowchart according to an example method for facilitating reduction in call drops in uplink power limited scenarios that can be performed by a serving network (e.g., by a serving base station and/or other serving network entity) based on a wireless communication device signaling its explicit uplink transmission power capability in accordance with some example embodiments. One or more of processing circuitry 510, processor 512, memory 514, or handover control module 518 can, for example, provide means for performing the operations illustrated in and described with respect to FIG. 10.

Operation 1000 can include receiving an indication of an explicit uplink transmission power capability of the wireless communication device 202 that has been signaled by the wireless communication device 202. In this regard, operation 1000 can include receiving signaling that can be sent by the wireless communication device 202 in operation 910 as described above. Operation 1010 can include defining a configuration parameter for measurement reporting configured specifically for the wireless communication device 202 based at least in part on the signaled indication of the explicit uplink transmission power capability. Operation 1020 can include sending the configuration parameter to the wireless communication device 202. In this regard, the send configuration parameter can correspond to the configuration parameter that can be received by wireless communication device 202 in operation 920.

In some example embodiments, explicit measurement reporting events can be defined for the wireless communication device 202 to send measurement reports when its transmission power is reaching a maximum capability. The network (e.g., serving base station) can use the measurement report for making handover decisions. As an example, a measurement report indicating an uplink transmission power limited condition can be signaled to the network when an uplink transmission power used by the wireless communication device 202 is within threshold range of an explicit maximum uplink transmission power of the wireless communication device. Accordingly, in such example embodiments, measurement reporting events for uplink transmission power limited scenarios can be defined such that the network can take into account uplink transmission power in addition to downlink power measurement reports in order to make handover decisions.

Figure 11:
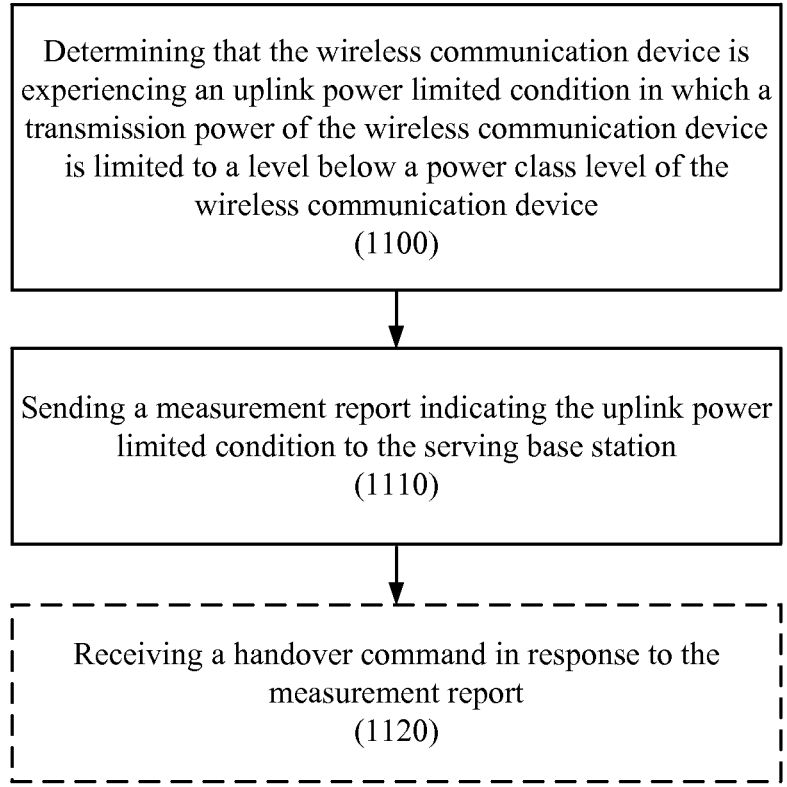
FIG. 11 illustrates a flowchart according to still a further example method for reducing call drops in uplink power limited scenarios in accordance with some example embodiments.

FIG. 11 illustrates a flowchart according to an example method that can be performed by wireless communication device 202 for reducing call drops in uplink power limited scenarios in accordance with some example embodiments in which explicit measurement reporting events can be defined for instances in which the wireless communication device 202 experiences an uplink power limited condition. One or more of processing circuitry 410, processor 412, memory 414, or management module 418 can, for example, provide means for performing the operations illustrated in and described with respect to FIG. 11.

Operation 1100 can include the wireless communication device 202 determining that it is experiencing an uplink power limited condition in which a transmission power of the wireless communication device 202 is limited to a level below a power class level of the wireless communication device 202. For example, in some example embodiments, operation 1100 can include the wireless communication device 202 determining that an uplink transmission power at which the wireless communication device 202 is transmitting is within a threshold range of an explicit maximum uplink transmission power to which the wireless communication device 202 can be limited. The explicit maximum uplink transmission power can be lower than a transmission power associated with a power class level of the wireless communication device 202. In this regard, in some example embodiments, operation 1100 can include determining that an available power headroom value is less than a threshold.

As another example, in some example embodiments, operation 1100 can include the wireless communication device 202 calculating a difference between a transmission power associated with the power class level of the wireless communication device and a transmission power at which the wireless communication device is transmitting (e.g., an explicit maximum uplink transmission power for the device) and comparing the difference to a threshold maximum (Pmax). In an instance in which the difference exceeds Pmax, the wireless communication device 202 can determine that it is experiencing an uplink power limited condition.

As a further example, in some example embodiments, operation 1100 can include the wireless communication device 202 determining that there are more than a threshold number of outstanding PDUs for SRB transmission.

Operation 1110 can include the wireless communication device 202 sending a measurement report indicating the uplink power limited condition to the serving base station. The measurement report can, for example, be a dedicated measurement report for reporting an uplink power limited condition.

The serving base station can use the measurement report as a basis for making a handover decision. If the serving base station determines to handover the wireless communication device 202 to another cell, the method can further include operation 1120, which can include the wireless communication device 202 receiving a handover command in response to the measurement report. The handover command can, for example, include a redirection to the alternative cell 206.

Figure 12:
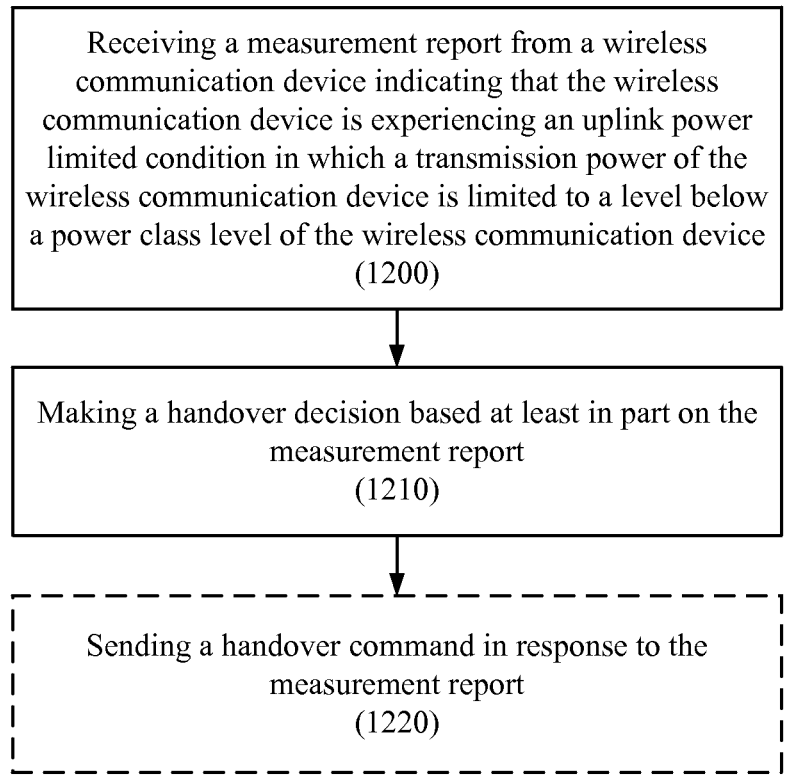
FIG. 12 illustrates a flowchart according to another example method for facilitating reduction in call drops in uplink power limited scenarios that can be performed by a serving network in accordance with some example embodiments.

FIG. 12 illustrates a flowchart according to an example method for facilitating reduction in call drops in uplink power limited scenarios that can be performed by a serving network (e.g., by a serving base station and/or other serving network entity) based on a wireless communication device sending a measurement report indicating an uplink power limited condition in accordance with some example embodiments. One or more of processing circuitry 510, processor 512, memory 514, or handover control module 518 can, for example, provide means for performing the operations illustrated in and described with respect to FIG. 12.

Operation 1200 can include receiving a measurement report from wireless communication device 202 indicating that the wireless communication device 202 is experiencing an uplink power limited condition in which a transmission power of the wireless communication device 202 is limited to a level below a power class level of the wireless communication device 202. In this regard, operation 1200 can include receiving a measurement report that can be sent by wireless communication device 202 in operation 1110, as described above.

Operation 1210 can include making a handover decision based at least in part on the measurement report. If the serving network decides to handover the wireless communication device 202 to another cell, the method can further include operation 1220, which can include sending a handover command to the wireless communication device 202 in response to the measurement report. The handover command can, for example, include a redirection to the alternative cell 206.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for reducing call drops in uplink power limited scenarios, the method comprising:
   by a wireless communication device:
   determining, at a baseband layer of the wireless communication device, that the wireless communication device is experiencing an uplink power limited condition in which an uplink transmission power of the wireless communication device to a wireless network is limited to not exceed a level below a power class level of the wireless communication device based at least in part on a comparison to a maximum uplink transmission power associated with the power class of the wireless communication device; and
   internally signaling within the wireless communication device, from a baseband layer of the wireless communication device to one or more of a transport layer or an application layer of the wireless communication device, an indication of the uplink power limited condition to cause the one or more of the transport layer or the application layer to slow a rate of delivery of data to the baseband layer for uplink transmission to the wireless network in response to the uplink power limited condition.

2. The method of claim 1, further comprising the application layer advertising a zero transmission control protocol (TCP) window size in response to the indication.

3. The method of claim 1, wherein the wireless communication device is connected to a network implementing a Long Term Evolution (LTE) radio access technology.

4. The method of claim 1, wherein determining that the wireless communication device is experiencing the uplink power limited condition comprises determining an available power headroom value is less than a power headroom threshold.

5. The method of claim 1, wherein determining that the wireless communication device is experiencing the uplink power limited condition further comprises determining that there are more than a threshold number of outstanding packet data units (PDUs) for signaling radio bearer (SRB) transmission.

6. The method of claim 1, wherein determining that the wireless communication device is experiencing the uplink power limited condition comprises the wireless communication device:
   calculating a difference between the maximum uplink transmission power associated with the power class level of the wireless communication device and the uplink transmission power at which the wireless communication device is transmitting;
   comparing the difference to a threshold maximum (Pmax); and
   determining that the wireless communication device is experiencing the uplink power limited condition in an instance in which the difference exceeds the threshold maximum.

7. A wireless communication device comprising:
   a transceiver configured to send signals to and receive signals from a cellular network; and
   processing circuitry in communication with the transceiver, the processing circuitry configured to control the wireless communication device to:
   determine, at a baseband layer of the wireless communication device, that the wireless communication device is experiencing an uplink power limited condition in which an uplink transmission power of the wireless communication device to a wireless network is limited to not exceed a level below a power class level of the wireless communication device based at least in part on a comparison to a maximum uplink transmission power associated with the power class of the wireless communication device; and internally signal within the wireless communication device, from a baseband layer of the wireless communication device to one or more of a transport layer or an application layer of the wireless communication device, an indication of the uplink power limited condition to cause the one or more of the transport layer or the application layer to slow a rate of delivery of data to the baseband layer for uplink transmission to the wireless network in response to the uplink power limited condition.

8. The wireless communication device of claim 7, wherein the processing circuitry is further configured to control the wireless communication device to:
cause the application layer to advertise a zero transmission control protocol (TCP) window size in response to the indication.

9. The wireless communication device of claim 7, wherein the processing circuitry is configured to control the wireless communication device to determine that the wireless communication device is experiencing the uplink power limited condition by at least determining an available power headroom value is less than a power headroom threshold.

10. The wireless communication device of claim 7, wherein the processing circuitry is configured to control the wireless communication device to determine that the wireless communication device is experiencing the uplink power limited condition by at least determining that there are more than a threshold number of outstanding packet data units (PDUs) for signaling radio bearer (SRB) transmission.

11. The wireless communication device of claim 7, wherein the processing circuitry is configured to control the wireless communication device to determine that the wireless communication device is experiencing the uplink power limited condition by at least:
calculating a difference between the maximum uplink transmission power associated with the power class level of the wireless communication device and the uplink transmission power at which the wireless communication device is transmitting;
comparing the difference to a threshold maximum (Pmax); and
determining that the wireless communication device is experiencing the uplink power limited condition in an instance in which the difference exceeds the threshold maximum.

12. A wireless communication device comprising:
a transceiver configured to send signals to and receive signals from a serving network; and
processing circuitry in communication with the transceiver, the processing circuitry configured to control the wireless communication device to:
calculate a difference between a maximum uplink transmission power associated with the power class level of the wireless communication device and an explicit uplink transmission power capability of the wireless communication device;
compare the difference to a threshold maximum (Pmax);
determine that the wireless communication device is experiencing the uplink power limited condition in an instance in which the difference exceeds the threshold maximum; and
signal the explicit uplink transmission power capability of the wireless communication device to the serving network.

13. The wireless communication device of claim 12, wherein the processing circuitry is configured to control the wireless communication device to signal the explicit uplink transmission power capability to the serving network by at least sending a capability information message comprising an indication of the explicit uplink transmission power capability to the serving network.

14. The wireless communication device of claim 12, wherein the processing circuitry is further configured to control the wireless communication device to:
receive a configuration parameter for measurement reporting configured specifically for the wireless communication device by the serving network based at least in part on the explicit uplink transmission power capability signaled to the serving network.

15. The wireless communication device of claim 14, wherein the configuration parameter comprises a configuration parameter defining a threshold for sending a measurement report indicating that a channel condition of a serving cell has become worse than the threshold.

16. The wireless communication device of claim 14, wherein the serving network comprises a network implementing a Long Term Evolution (LTE) radio access technology, and wherein the configuration parameter defines an A2 measurement event threshold.

* * * * *